United States Patent
Zhou et al.

(10) Patent No.: US 9,715,588 B2
(45) Date of Patent: *Jul. 25, 2017

(54) METHOD OF DETECTING A MALWARE BASED ON A WHITE LIST

(71) Applicants: Beijing Qihoo Technology Company Limited, Beijing (CN); Qizhi Software (Beijing) Company Limited, Beijing (CN)

(72) Inventors: Hongyi Zhou, Beijing (CN); Xiangdong Qi, Beijing (CN)

(73) Assignees: Beijing Qihoo Technology Company Limited, Beijing (CN); Qizhi Software (Beijing) Company Limited, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/674,552

(22) Filed: Mar. 31, 2015

(65) Prior Publication Data

US 2015/0205960 A1 Jul. 23, 2015

Related U.S. Application Data

(63) Continuation of application No. 13/817,563, filed as application No. PCT/CN2011/078458 on Aug. 16, 2011, now Pat. No. 9,047,466.

(30) Foreign Application Priority Data

Aug. 18, 2010 (CN) .......................... 2010 1 0256973

(51) Int. Cl.
*G06F 21/56* (2013.01)
*G06F 17/30* (2006.01)
*G06F 21/52* (2013.01)

(52) U.S. Cl.
CPC ........ *G06F 21/56* (2013.01); *G06F 17/30876* (2013.01); *G06F 21/52* (2013.01); *G06F 21/566* (2013.01); *G06F 2221/034* (2013.01)

(58) Field of Classification Search
CPC ........ G06F 21/56; G06F 21/564; G06F 21/51; H04L 63/145; H04W 12/12
See application file for complete search history.

(56) References Cited

U.S. PATENT DOCUMENTS 7,640,589 B1 12/2009 Mashevsky et al.
8,266,698 B1 * 9/2012 Seshardi ................. G06F 21/53
726/22

(Continued)

FOREIGN PATENT DOCUMENTS

CN 100585534 C 1/2010
CN 101650768 A 2/2010

(Continued)

OTHER PUBLICATIONS

Robinson et al. (NPL: ip.com, Online Verification of Executable Files, Nathan Robinson, IP.com No. IPCOM000185273D, Jul. 19, 2009).*

(Continued)

*Primary Examiner* — Eleni Shiferaw
*Assistant Examiner* — Mary Li
(74) *Attorney, Agent, or Firm* — Troutman Sanders LLP

(57) ABSTRACT

A method of detecting a malware based on a white list comprises: receiving on a server side a program feature and/or a program behavior of a program to be detected sent from a client side; comparing the program feature and/or the program behavior of the detected program with legitimate program features and/or legitimate program behaviors stored in a white list; obtaining a legitimacy information of the unknown program based on the comparison result and (Continued)

feeding this back to the client side. In the invention, a legitimate program is determined by using a white list, thereby determining an illegitimate program excluded from the white list as a malware, which performs a determination and detecting and removing of a malware from another perspective.

9 Claims, 3 Drawing Sheets

(56) References Cited

U.S. PATENT DOCUMENTS

| | | | |
|---|---|---|---|
| 8,719,924 B1* | 5/2014 | Williamson | G06F 21/568 713/188 |
| 2006/0095971 A1* | 5/2006 | Costea | G06F 21/56 726/26 |
| 2009/0158430 A1 | 6/2009 | Borders et al. | |
| 2011/0083180 A1* | 4/2011 | Mashevsky | G06F 21/55 726/23 |

FOREIGN PATENT DOCUMENTS

| | | |
|---|---|---|
| CN | 101788915 A | 7/2010 |
| CN | 101923609 A | 12/2010 |
| CN | 101924761 A | 12/2010 |

OTHER PUBLICATIONS

International Search Report for PCT/CN2011/078458.

* cited by examiner

METHOD OF DETECTING A MALWARE BASED ON A WHITE LIST

CROSS REFERENCE RELATED TO PATENT APPLICATIONS

This application is a continuation of U.S. application Ser. No. 13/817,563, filed on Mar. 12, 2013, which is a national stage entry of International Application No. PCT/CN2011/078458, filed on Aug. 16, 2011, which claims priority to Chinese patent application No. 201010256973.3 submitted to China Patent Office on Aug. 18, 2010 and entitled "a method of detecting a malware based on a white list", all of which are incorporated herein by reference as if each was restated in full.

FIELD OF THE INVENTION

This invention pertains to the field of network security, and in particular, relates to a method of detecting a malware based on a white list.

BACKGROUND OF THE INVENTION

The traditional preventing and removing of malware relies mainly on feature library approaches. A feature library consists of feature codes of malware's samples collected by a manufacturer, while a feature code is a segment of program code, similar to "search keyword", intercepted by an analysis engineer from where a malware is found to be different from a goodware. During the process of detecting and removing, an engine will read a file and match it with all of the feature codes ("keywords") in the feature library; and if a program code of the file is found to be hit, the program of the file may be determined as a malware.

Afterwards, a way in which antivirus is performed heuristically locally is derived, and is a dynamic heighter or decompiler implemented in a particular way, wherein the virus' hidden real motive is gradually understood and determined by decompiling a related sequence of instructions. Differences between a malware and a goodware may be embodied in many aspects. For example, for an application program, an initial instruction usually is to examine whether there is a parameter entry in the command line input, to clear screen or to store the original screen display, etc., whereas for a malware, usually an initial instruction is a direct disk write operation, a decoding instruction, or a sequence of related operation instructions such as searching an executable program under a certain path, etc. These significant differences will be completely clear in a debugging state to a skilled programmer only at a glance. The heuristic code scanning technique is actually a specific program implementation which transplants such experiences and knowledge into a software for detecting and removing viruses.

However, all of the above-mentioned methods for detecting and removing a malware are based on a malicious behavior and/or a malicious feature, wherein they first determine if a program is a malware, and then decide whether to kill or clean it up. This inevitably results in the following disadvantages.

According to statistics, nowadays the number of malwares around the world increases exponentially. Based on such an explosive growth rate, the generation and update of a feature library often lags behind, and the supplement of malwares' feature codes in the feature library can not keep up with endlessly emergent unknown malwares.

In addition, in recent years, with the application of the anti-antivirus technique by a malware producer, means for packing a malware or modifying feature codes of the malware appear more and more, and many Trojan programs employ more and more frequent and quick automatic variations, all of which result in that it is more and more difficult to determine a malware by a malicious behavior and/or a malicious feature, thereby leading to the difficulty in detecting and removing or cleaning up a malware.

SUMMARY OF THE INVENTION

In view of these, the technical problem to be solved by the invention is to provide a method of detecting a malware based on a white list, which does not rely on a local database and reversely determines a malware based on the identification of a legitimate program.

To solve the above technical problem, the invention discloses a method of detecting a malware based on a white list comprising: establishing, collecting and updating a white list of legitimate programs in a database on a server side; collecting a program feature and/or a program behavior of a program on a client side and sending it to the server side for query; performing an analysis and comparison in the white list by the server side based on the program feature and/or the program behavior, and determining the legitimacy or trust value of the program based on the comparison result and feeding this back to the client side.

Further, based on the program feature and/or the program behavior, the server side performs a comparison with legitimate program features and/or legitimate program behaviors stored in the white list, and if hit, determines the program as a legitimate program, and feeds this back to the client side; if missed, then determines the program as a malware, and feeds this back to the client side.

Further, based on a set of program features and/or a set of program behaviors of a program, the server side performs a comparison with legitimate program features and/or legitimate program behaviors stored in the white list, assigns a trust value to the program based on the hit degree and feeds the trust value back to the client side; the client side presets a threshold, performs a comparison with the threshold based on the trust value, and if the trust value is not less than the threshold, then determines the program as a legitimate program, and if the trust value is less than the threshold, then determines the program as a malware.

Further, if the set of program features and/or the set of program behaviors is all hit in the white list, then the server side assigns a highest trust value to the program; if the set of program features and/or the set of program behaviors is all missed in the white list, then the server side assigns a lowest trust value to the program.

Further, also comprised is: based on the result of determination, the client side deciding to intercept the malware's behavior, terminate the malware and/or clean up the malware, and restoring the system environment.

Further, also comprised is: based on the result of determination and in combination with the attributes of the malware, the client side deciding whether to intercept the malware behavior, terminate the malware and/or clean up the malware.

Further, the attributes comprise: whether the malware is a self-starting program and/or whether the malware exists in the system directory.

Further, the step of collecting and updating the white list of legitimate programs in the database on the server side comprises: periodically collecting the legitimate programs by a technician manually, by a spider or web crawler and/or by a user's uploading operation; and, screening the program feature and/or the program behavior of the legitimate programs manually or automatically by a tool and storing it in the white list.

Further, the step of collecting and updating the white list of legitimate programs in the database on the server side comprises: based on the legitimate program features and their corresponding program behaviors in the existing known white list, performing an analysis on an unknown program feature and program behavior so as to update the white list.

Further, the program feature comprises: a static feature and/or a static feature string in a program file.

Further, the step of performing the analysis on the unknown program feature and its program behavior comprises: if the unknown program feature is identical to a known program feature in the existing white list, then including the unknown program feature and its program behavior in the white list; if the unknown program behavior is identical or similar to a known program behavior in the existing white list, then including the unknown program behavior and its program feature in the white list; when a certain program behavior is included in the white list, including in the database a program feature corresponding to the certain program behavior in the white list, and also including other program behaviors and program features having an associated relationship with the certain program behavior in the white list; and/or when a certain program feature is included in the white list, including in the database a program behavior corresponding to the certain program feature in the white list, and also including other program behaviors and program features having an associated relationship with the certain program feature in the white list.

Further, also comprised is: establishing an associated relationship of behavior and feature between programs having an identical or similar behavior, and based on the associated relationship between the programs having an identical or similar behavior, performing an analysis on an unknown program feature and program behavior to update the white list.

In comparison with the prior solutions, the technical effects obtained by the invention are as follows:

In the invention, a legitimate program is determined by using a white list, thereby determining an illegitimate program excluded from the white list as a malware, which performs a determination and detecting and removing of a malware from another perspective;

At the same time, a cloud security architecture is introduced, wherein all "cloud security" clients are connected in real time to a "cloud security" server, and the determination and analysis process of a legitimate program is left on the server side to be accomplished;

Additionally, also in the invention a program behavior is collected by the client side and associated to a program feature, such that the program feature and its corresponding program behavior are recorded in the database, and based on an associated relationship of the collected program behavior and the program feature, an analysis and induction may be performed on the collected samples in the database, thereby facilitating discrimination of the legitimacy of a software or program.

BRIEF DESCRIPTION OF THE DRAWINGS

In the following, drawings used in the description of embodiments or the prior art are briefly introduced, in order to more clearly describe technical solutions in embodiments of the invention or the prior art. Obviously, the drawings in the following description are only some embodiments of the invention; for those of ordinary skills in the art, other drawings may also be obtained based on these drawings.

DETAILED DESCRIPTION OF THE INVENTION

In the following, the implementations of the invention will be described in detail in combination with various illustrations and embodiments, by means of which the implementing process how the invention applies technical means to solve technical problems and achieve technical effects will be fully understood and implemented.

The core concept of the invention lies in that a white list of legitimate programs is established, collected and updated in a database on a server side; a program feature and/or a program behavior of a program is collected on a client side and is sent to the server side for query; on the server side an analysis and comparison is performed with the white list based on the program feature and/or the program behavior, and the program is determined based on the comparison result and a result of determination is fed back to the client side.

Figure 1:
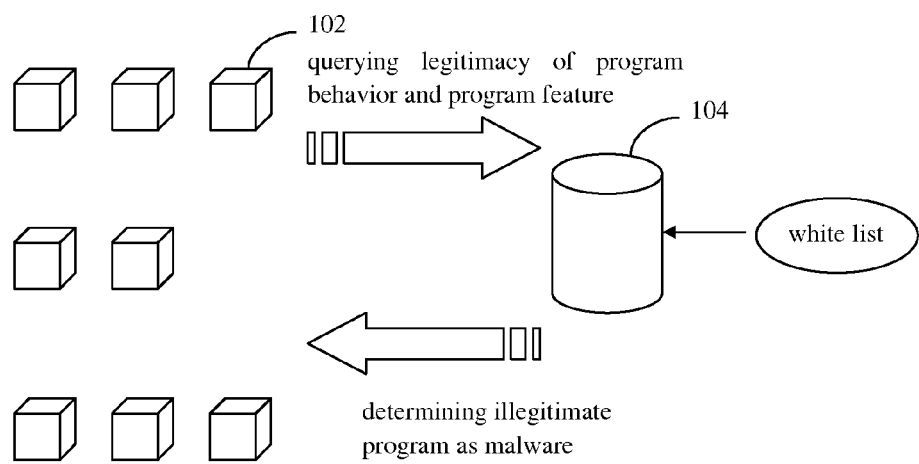
FIG. 1 is a schematic drawing of an implementation mode of the invention.

In the following, a method of detecting a malware based on a white list will be described in a cloud security mode constituted by a large number of client computers 102 and a server side 104. A cloud structure is a large-scale client/server (CS) architecture, as shown in FIG. 1, which is a schematic drawing of an implementation mode of the invention.

Figure 2:
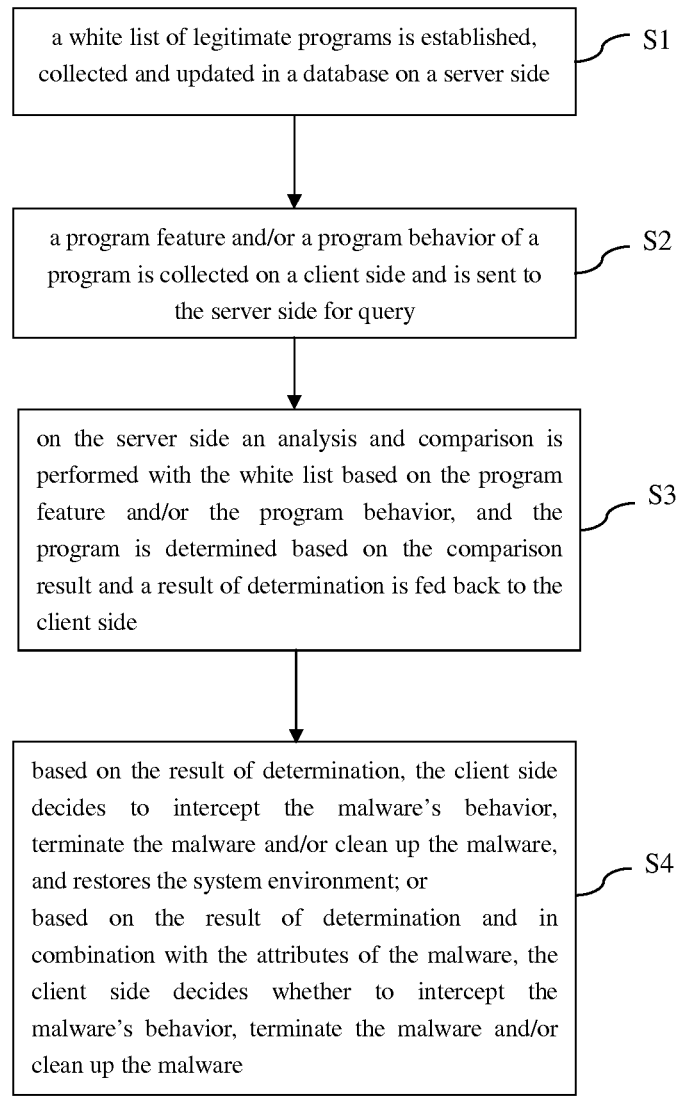
FIG. 2 is a flow chart of a method of detecting a malware based on a white list according to the invention.

Reference is made to FIG. 2, which is a flow chart of a method of detecting a malware based on a white list according to the present invention, comprising:

S1, a white list of legitimate programs is established, collected and updated in a database on a server side;

S2, a program feature and/or a program behavior of a program (for the ease of differentiation, the program is called a "program to be detected") is collected on a client side and is sent to the server side for query;

S3, on the server side an analysis and comparison is performed with the white list based on the program feature and/or the program behavior, and the program is determined based on the comparison result and a result of determination is fed back to the client side;

S4, based on the result of determination, the client side decides to intercept the malware's behavior, terminate the malware and/or clean up the malware, and restores the system environment; or based on the result of determination and in combination with the attributes of the malware, the client side decides whether to intercept the malware's behavior, terminate the malware and/or clean up the malware.

The attributes comprise: whether the malware is a self-starting program and/or whether the malware exists in the system directory.

As for the step S3, it can be particularly implemented in the following way or ways.

A first way: On the server side, the program feature and/or the program behaviour is compared with legitimate program features and/or legitimate program behaviors stored in the white list. If hit, the program is determined as a legitimate program, and the result of determination is fed back to the client side. If missed, the program is determined as a malware, and the result of determination is fed back to the client side. As can be seen, in this way, the server side may determine whether the detected program is a malware, then feed the result of determination back to the client side, and the client side may know whether the detected program is a malware directly based on the result fed back by the server side.

A second way: On the server side, a set of program features and/or a set of program behaviors of a program are compared with legitimate program features and/or legitimate program behaviors stored in the white list, and a trust value is assigned to the program based on the hit degree and is fed back to the client side. On the client side, the trust value is compared with a preset threshold. If the trust value is not less than the threshold, the program is determined as a legitimate program, and if the trust value is less than the threshold, then the program is determined as a malware. As can be seen, in this way, the server side does not determine if the program is malicious or not, but only generates a trust value, and feeds the trust value as legitimacy information back to the client side, and after the reception of the trust value, the client side itself needs to perform a comparison with the preset threshold, and only after this can it be determined whether the detected program is a malware.

With respect to the setting of the trust value, if the set of program features and/or the set of program behaviors is all hit in the white list, then the server side assigns a highest trust value to the program; if the set of program features and/or the set of program behaviors is all missed in the white list, then the server side assigns a lowest trust value to the program; for a program in between the two hit rates, it is set according to the above trend.

As for the step S1, the collecting and updating of the white list of legitimate programs in the database on the server side may be realized in the following way or ways.

A first way is: periodically collecting the legitimate programs by a technician manually, by a spider or web crawler and/or by a user's uploading operation; and, screening the program feature and/or the program behavior of the legitimate programs manually or automatically by a tool and storing the same in the white list.

A second way is: based on the legitimate program features and the corresponding program behaviors in the existing known white list, analysing an unknown program feature and program behavior so as to update the white list.

The program feature may be a static feature in a program file, for example, an MD5 (Message-Digest Algorithm 5) verification code obtained via the MD5 operation, or an SHA1 code, or a CRC (Cyclic Redundancy Check) code, etc., which is a feature code that can uniquely identify the original program; and may also be a static feature string in a program file.

In the following, the construction and dynamic maintenance of the white list of the database on the server side according to the second way will be described.

The processing ideas are mainly as follows. Based on program features and their corresponding program behaviors in the existing known white list, an analysis is performed on an unknown program feature and program behavior in order to update the white list. Such a comparison and analysis sometimes does not need to trace the behavior itself of the program, but only needs to simply compare with known program behaviors in the existing white list so as to determine the nature of the unknown program.

Since in the database are recorded a program feature and a behavior record corresponding to the feature, the unknown program may be analyzed in combination with the known white list.

For example, if the unknown program feature is identical to a known program feature in the existing white list, then the unknown program feature and its program behavior are both included in the white list.

If the unknown program behavior is identical or similar to a known program behavior in the existing white list, then the unknown program behavior and its program feature are both included in the white list.

Through the analysis of records in the database, it can be found that some programs have identical or similar behaviors but different features. In this case, as long as an associated relationship of behavior and feature is established between the programs having identical or similar behaviors, based on such an associated relationship, an analysis may be performed conveniently on an unknown program feature and program behavior to update the white list.

Figure 3:
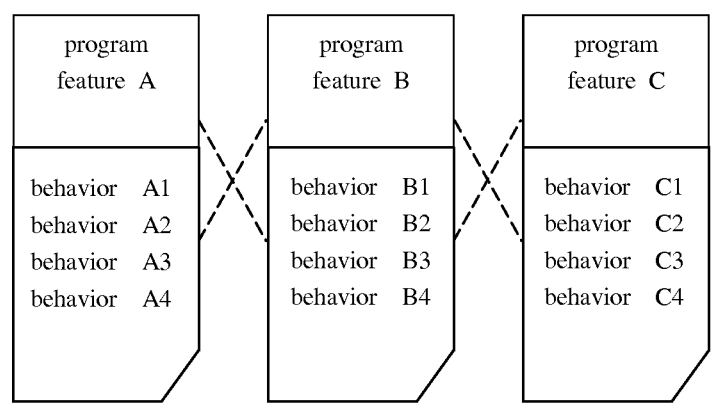
FIG. 3 is a schematic drawing of an associated relationship according to an embodiment of the invention.

As shown in FIG. 3, FIG. 3 is a schematic drawing of an associated relationship according to an embodiment of the invention. Assume that the features of unknown programs A, B, and C are A, B, and C, respectively, and their respective corresponding program behaviors are A1~A4, B1~B4, C1~C4. If after analysing it is found that the program behaviors A1~A4, B1~B4, C1~C4 are substantially identical or very similar, then an associated relationship of feature and behavior may be established between the features A, B, and C and the behaviors A1~A4, B1~B4, C1~C4.

Through such an associated relationship, the database may be maintained more conveniently in a self-expanding manner under some conditions. For example, when the program behaviors B1~B4 of the program B are confirmed as legitimate program behaviors and included in the white list, the program feature B corresponding to the program behaviors may be automatically included in the white list in the database, and at the same time, the program behaviors A1~A4, C1~C4 and the corresponding program features A, C having an associated relationship with the program behaviors may also be automatically included in the white list according to the associated relationship.

For another example, if initially the programs A, B, and C all belong to programs with unknown black/white nature, and then the program feature B is first confirmed as a feature belonging to a legitimate program via other antivirus approaches, not only a combination of the behaviors B1~B4 may be automatically included in the white list in the database, but also the features A and C having identical or similar behaviors may be included in the white list and further the program behaviors A1~A4, C1~C4 may be also included in the white list according to the associated relationship.

In the present invention, since a behavior corresponding to a program feature is recorded in the database, this results in providing a great convenience to analysis of a behavior of unknown program. The invention is not limited to the above analysis method, and methods similar to Decision Tree, Bayesian Algorithm, Neural Network Computation, etc., or the simple threshold analysis, may be well applied on the basis of the database of the invention.

The above description shows and describes several preferred embodiments of the invention, however, as previously mentioned, it is to be understood that the invention is not limited to the form disclosed herein, and should not be regarded as an exclusion of other embodiments, but may be applied in various other combinations, modifications and environments, and may be altered according to the above teachings or techniques or knowledge in a related art within the scope of the inventive concepts described herein. And as long as the alterations and variations made by the skilled in the art do not depart from the spirit and scope of the invention, they all should fall within the protection scope of the appended claims of the invention.

The invention claimed is:

1. A server, comprising:
   a white list, said white list storing legitimate program features or legitimate program behaviors;
   a processor coupled with a memory, said processor executing the following software programs stored in the memory:
   a first software program, said first software program receiving a program feature or a program behavior of an unknown program to be detected using spider or web crawler sent from a client;
   a second software program, said second software program comparing the program feature or the program behavior of the detected program with the legitimate program features or the legitimate program behaviors stored in the white list; and
   a third software program, said third software program obtaining a legitimacy information of the unknown program based on the comparison result and feeding the legitimacy information back to the client;
   a fourth software program, said fourth software program establishing an associated relationship between a program behavior and another program behavior as well as between a program feature and a corresponding program feature;
   a fifth software program, said fifth software program updating the white list based on the associated relationship;
   wherein said fifth software program updates the white list by:
      when a certain program behavior is included in the white list, including in the white list a program feature corresponding to the certain program behavior, and also including other program behaviors and program features having the associated relationship with the certain program behavior in the white list; or when a certain program feature is included in the white list, including in the white list a program behavior corresponding to the certain program feature, and also including other program behaviors and program features having the associated relationship with the certain program feature in the white list.

2. The server of claim 1, wherein the obtaining of the legitimacy information of the unknown program based on the comparison result and the feeding of the legitimacy information back to the client comprise: if the program feature and/or the program behavior of the detected program hits a legitimate program feature and/or a legitimate program behavior stored in the white list, then determining the detected program as a legitimate program, and feeding this back to the client; if missed, then determining the detected program as a malware, and feeding this back to the client.

3. The server of claim 1, further comprising a software program comparing a set of program features and/or a set of program behaviors of the detected program with the legitimate program features and/or the legitimate program behaviors stored in the white list, assigning a trust value to the detected program based on a hit degree and feeding the trust value back to the client, so as to determine whether the detected program is a malware based on the trust value and a preset threshold on the client.

4. The server of claim 3, wherein if the set of program features and/or the set of program behaviors is all hit in the white list, then a highest trust value is assigned to the program; and if the set of program features and/or the set of program behaviors is all missed in the white list, then a lowest trust value is assigned to the program.

5. The server of claim 1, further comprising:
   a software program based on the legitimate program features and their corresponding program behaviors existing in the white list, analyzing an unknown program feature and its corresponding program behavior so as to update the white list.

6. The server of claim 1, wherein the associated relationship is established according to the similarity between program behaviors of individual programs as well as a corresponding relationship between a program behavior and a program feature.

7. The server of claim 1, wherein the program feature comprises: a static feature code uniquely identifying a program file and/or a static feature string in a program file.

8. The server of claim 1, further comprising a database, said database storing the program feature and program behavior.

9. A method for detecting a malware based on a white list, comprising:
   establishing a white list that stores legitimate program features and corresponding legitimate program behaviors;
   comparing a program feature and/or a program behavior of a detected program using spider or web crawler with the legitimate program features and/or the legitimate program behaviors stored in the white list;
   obtaining a legitimacy information of the detected program based on the comparison result;
   establishing an associated relationship between a program behavior and another program behavior as well as between a program feature and a corresponding program behavior; and
   updating, based on the associated relationship, the white list by:
      when a certain program behavior is included in the white list, including in the white list a program feature corresponding to the certain program behavior, and also including other program behaviors and program features having the associated relationship with the certain program behavior in the white list; or when a certain program feature is included in the white list, including in the white list a program behavior corresponding to the certain program feature, and also including other program behaviors and program features having the associated relationship with the certain program feature in the white list.

* * * * *